Sept. 3, 1968  M. SIMONICH  3,399,809
OPERATING DEVICE FOR A CLOSING MEMBER OF AN ICE-CREAM
DISPENSING NOZZLE IN AN ICE-CREAM CONTINUOUSLY
PRODUCING APPARATUS Filed April 14, 1967  2 Sheets-Sheet 1

INVENTOR
MARIO SIMONICH
BY Sterling + Blake
ATTORNEYS

Sept. 3, 1968   M. SIMONICH   3,399,809
OPERATING DEVICE FOR A CLOSING MEMBER OF AN ICE-CREAM
DISPENSING NOZZLE IN AN ICE-CREAM CONTINUOUSLY
PRODUCING APPARATUS
Filed April 14, 1967   2 Sheets-Sheet 2

INVENTOR
MARIO SIMONICH
BY Sternberg & Blake
ATTORNEYS

United States Patent Office 3,399,809
Patented Sept. 3, 1968

3,399,809
OPERATING DEVICE FOR A CLOSING MEMBER OF AN ICE-CREAM DISPENSING NOZZLE IN AN ICE-CREAM CONTINUOUSLY PRODUCING APPARATUS
Mario Simonich, Via Legionari di Polonia, 25, Bergamo, Italy
Filed Apr. 14, 1967, Ser. No. 630,934
10 Claims. (Cl. 222—70)

ABSTRACT OF THE DISCLOSURE

A mechanical operating device for a closing member of the outflow opening of an ice-cream dispensing nozzle in a creamy ice-cream continuously producing apparatus. The device includes a first continuously rotating body, a second body connected to said closing member by a kinematic assembly, and manually operable means for mechanically controlling the rotatable restraint and release, respectively, of the first body and second body to each other.

---

This invention relates to an operating device for a closing member of an ice-cream dispensing nozzle in an ice-cream continuously producing apparatus and is more particularly concerned with an automatically and mechanically operating device for said closing member.

Many types of creamy ice-cream continuously producing apparatus are known, such apparatus being of an increasing wide-spread use and comprising, as essential members thereof, an ice-cream dispensing nozzle, a closing member operable to selectively open and close said nozzle, and feeding means for the ice-cream to the nozzle.

In known apparatus, and generally in the form of a sluice-gate or a cock, the closing member for the dispensing nozzle is controlled by a manually operable lever. Such a structure results in some serious disadvantages, one of which consisting of the operator being substantially prevented from keeping the closing member open for a period constant and accurately defined time by time, said period affecting the amount of ice-cream being delivered and generally collected on wafers, cones or the like. A further disadvantage is that for apparatus operation a controller has to be present to prevent unskilled persons from keeping the closing member at open position for an extremely or unduly long period, so that the amount of ice-cream being delivered cannot be contained within the cone below the dispensing nozzle.

Accordingly, it is the object of the present invention to provide a mechanically operating device for the closing member of a dispensing nozzle for a creamy ice-cream continuously producing apparatus, wherein when operated, will keep said closing member open for a constant and predetermined period of time, and at the end of which said device will automatically cause the closing of the dispensing nozzle.

Another object is to provide a device which may be very simply operated even by unskilled persons and not requiring the presence of skilled staff.

The above and other objects are attained by a device comprising an ice-cream dispensing nozzle, a closing member operable to selectively open and close said nozzle, and means for feeding ice-cream to the nozzle, wherein the device includes a frame, a first rotary body on said frame, means for controlling the rotation of the first body, a second body carried on said frame and freely rotatable about an axis coincident with the axis of rotation for said first body, means for rotatably restraining the first and second bodies to each other at at least one predetermined relative angular position, means movable between a first position of non-engagement with said restraining means, rotatably restraining under such conditions the first and second bodies, and a second position of engagement with said restraining means, not restraining under such conditions the first and second bodies, means for controlling the movement of said movable means between said first position and said second position, and a kinematic assembly connecting said second body to said closing member for said nozzle.

In order that the structure of a device according to the present invention may be more clearly understood, an embodiment thereof will now be described by mere way of example and not of limitation, reference being made to the accompanying drawings, in which.

Figure 1:
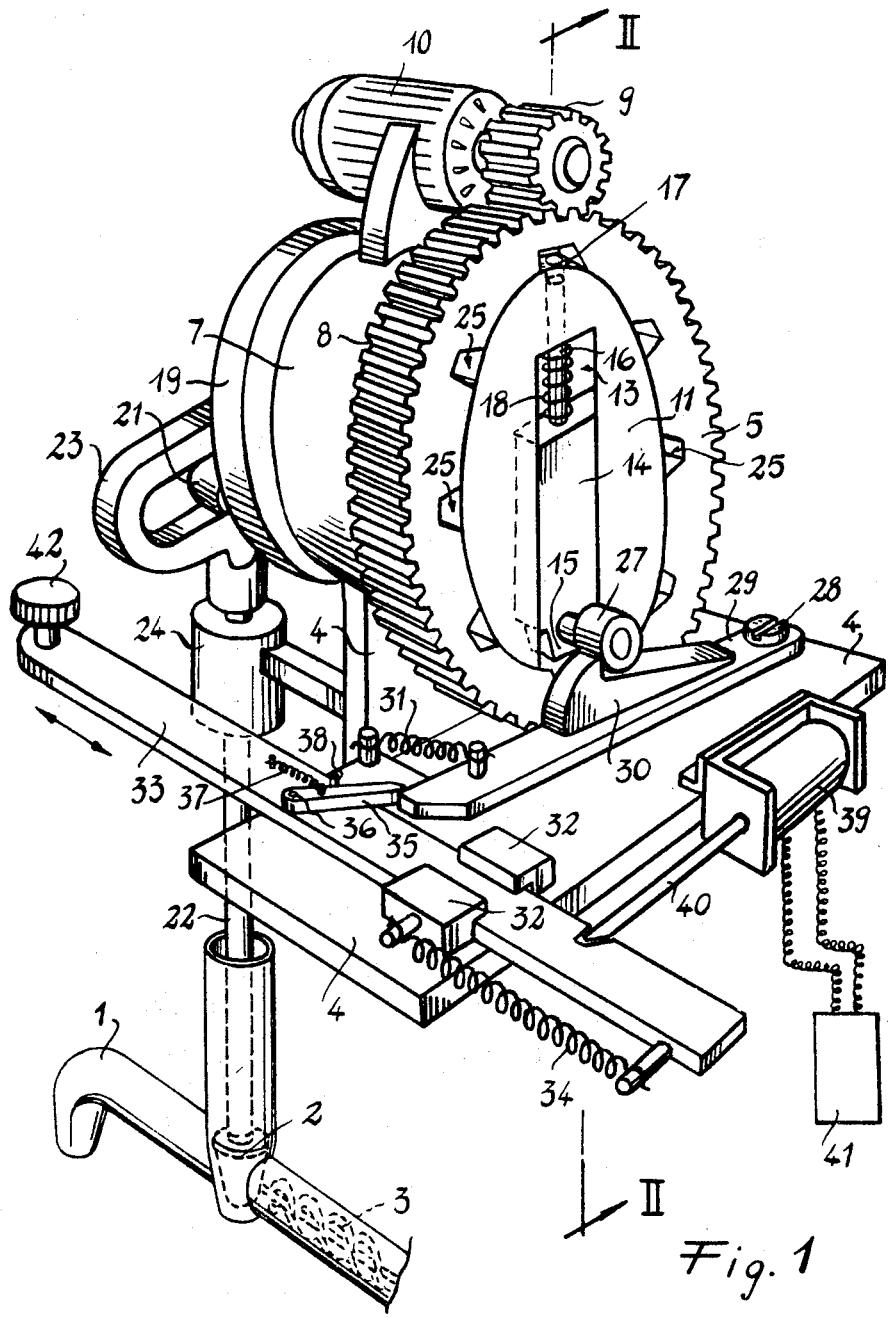
FIG. 1 is a perspective view of the device.

A creamy ice-cream continuously producing apparatus has not been shown in detail in the figures, since such an apparatus is of a well known structure to those skilled in the art and of a commercially ready availability. However, some components of the apparatus have been fully diagrammatically shown, and namely, the ice-cream dispensing nozzle 1, the closing member or cock 2, and a screw 3 for ice-cream feeding to said nozzle 1. The operating device for cock 2 includes a framework 4 bearing a first rotary body formed of a disc-like body 5, from which a hollow hub 6 projects, said hub being rotatably accommodated within a sleeve 7 forming part of framework 4. As it can be seen from the figures, a ring gear 8 is provided on the periphery of the disc-like body 5 and a pinion gear 9 engages therewith, said pinion gear 9 being keyed on the driving shaft of an electric motor 10 fast with the framework.

A bore, defined at its periphery by a cylindrical circular cross-section wall, the contour of which can be seen in FIG. 1, is formed within body 5; within said bore, defined by the cylindrical wall, a second body 11 is rotatably accommodated, said second body 11 being in the form of a circumferentially circular disc, with which a hub 12 accommodated and rotable inside the bore of hub 6 is fast. As it can be seen from the figures, hub 12 and second body 11 therewith are rotatable about an axis coinciding with the axis of rotation for the disc-like body 5 and hub 6.

In body 11 a straight groove 13 is provided, said groove extending diametrically on the body itself and having a dovetail cross-section. Within groove 13 a slide 14 is accommodated and movable, at one end thereof said slide having a toothed projection 15, while at the other end being fast with a rod 16 slidable within a hole 17 radially in body 11. About rod 16 a spring 18 is wound and acting on slide 14 so as to urge the toothed projection 15 towards the cylindrical wall of the disc-like body bore 5.

On the end of hub 12, opposite to that end at which the hub is fast with body 11, a disc 19 is keyed having a cam pin 20 projecting therefrom, on which a roller 21 is rotatably mounted. An end of a rod 22 is fast with cock 2, the other end of said rod having a head 23 in which an oval elongated eye is provided. Roller 21, mounted on pin 20, is accommodated and movable within said eye. Rod 22 is inserted and guided in a cylindrical hole in a body 24 cantilever supported by framework 4.

As can be seen from the figures, recesses 25 are formed on the cylindrical wall of the disc-like body bore 5, such recesses being angularly spaced to one another and of a shape complementary to that of the toothed projection 15 of slide 14; it will also be noted that from said slide 14 a stake 26 projects, on which a roller 27 is rotatably mounted.

On framework 4 a lever 29 is pivoted about a pin 28, which lever is rotatable about said pin and carries a rigid body 30, the roller 27 facing surface of which is in the form of a ramp plane. The left end of the rigid body 30, as from FIG. 1, is hook-wise raised for the purpose of retaining roller 27 as hereinafter will be more clearly apparent.

Rigid body 30 is normally held at the position shown in the figures by a spring 31, the ends of which are secured by two stakes, one of such stakes being fast with framework 4 and the other being fast with lever 29.

Two guide elements 32 are fixed on framework 4, between which guide elements a movable bar 33 is accommodated and guided, having the tendency to be retained at the position shown in FIG. 1 by a spring 34, an end of which is connected to a stake fixed to bar 33, and the other end of which is fixed to a stake fast with one of the guide elements 32. Still from FIG. 1, on movable bar 33 a tooth 35 is mounted, said tooth being rotatable about a pivot 36 fixed on bar 33. On tooth 35 a spring 37 acts and tends to hold said tooth urged against a stop stake 38 fast with bar 33.

The free end of tooth 35 projects from bar 33 and is adjacent the free end of lever 29, said tooth interfering therewith when bar 33 is moved against the action of spring 34.

Finally, it can be noted that an electromagnet 39 is fixed to framework 4, the electromagnet comprising a movable elongated core 40 projecting towards bar 33. Under the conditions shown in FIG. 1, in which the electromagnet is not energized, the free end of the movable core 40 is accommodated within a notch in bar 33, the movement of which is thus prevented by said movable core 40 acting as a latch. The winding of electromagnet 39 is connected to a coin device 41 of the type commonly mounted on automatic dispensing slot-machines, by which energization of the electromagnet is controlled. The structure of coin device 41 is not herein described in detail, as well known to those skilled in the art, the structure being such that by introducing a coin into said coin device the electric circuit of electromagnet 39 is closed, by which the movable core 40 is caused to retract into said electromagnet and release, on moving rightward to FIG. 1, bar 33 which is therefore no longer clamped and thus may be moved, as hereinafter explained.

Figure 2:
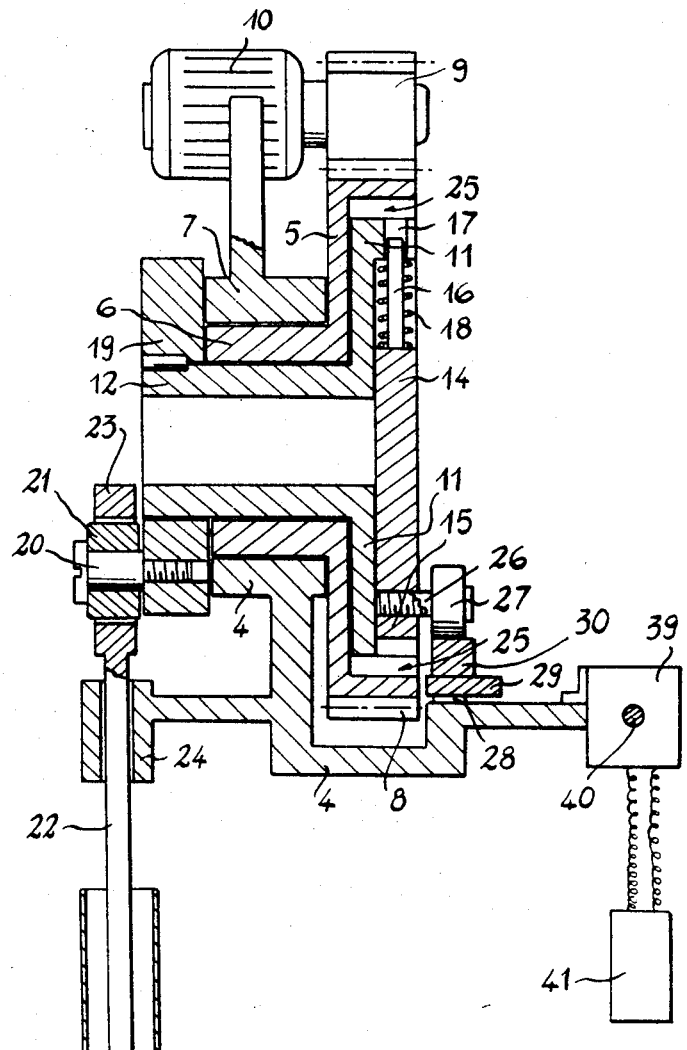
FIG. 2 is a vertical section of said device according to line II—II of FIG. 1.

Assuming now that the creamy ice-cream continuously producing apparatus is operating, i.e., assuming that continuously rotating screw 3 is urging creamy ice-cream to the dispensing nozzle 1, but the outlet hole of said nozzle is closed by closing member 2 and is therefore at the position shown in FIGS. 1 and 2. Be it also assumed that electric motor 10, and pinion gear 9 and body 5 with ring gear 8, are continuously rotating. Under the conditions shown in the figures, roller 27 supported by slide 14 is at the top of the ramp surface of the rigid body 30, and therefore the toothed projection 15 is not inserted in any of the recesses 25 of body 5, so that said body 5 and body 11 are not restrained to each other and body 11 is stationary while body 5 is continuously rotating.

When it is desired to provide for ice-cream delivery from dispensing nozzle 1, a coin needs to be introduced into the coin device 41, which energizes electromagnet 39 causing the movable core 40 to retract thereinto, thus releasing bar 33. By operating on pushbutton 42 fast with bar 33 it is thus possible to urge said bar to the right as seen from FIG. 1. During this movement, the free end of tooth 35 operates on the free end of lever 29, which is caused to rotate about pivot 28 until roller 27 is released from the ramp surface and hook of body 30. Under these conditions, spring 18 is acting on slide 14 causes toothed projection 15 of said slide 14 to approach the cylindrical surface of the bore in body 5. Toothed projection 15 slides on said cylindrical surface until a recess 25 is beneath toothed projection 15, which is urged by spring 18 into said recess. Thus, body 5 and body 11 are rotatably restrained to each other and rotation is transmitted from motor 10 via gear pinion 9 and body 5 to body 11, and from the latter via hub 12 to disc 19 and roller 21, which effects a revolution about the axis of rotation of body 5. During this revolution, roller 21 moves into oval head eye 23 of rod 22, which is therefore automatically and mechanically raised and then lowered, thus opening and closing the flow opening of the dispensing nozzle 1.

Be it assumed for more clarity that disc 5 rotates clockwise with respect to FIG. 1. When bodies 5 and 11 are restrained to each other as stated, roller 21 starts to rotate about the axis of rotation of body 5. As roller 21, along with body 11, rotates through the first 180°, rod 22 will move upwardly and closing member or cock 2 will move therewith, thus freeing the outflow opening of dispensing nozzle 1 through which the creamy ice-cream produced by the ice-cream continuously producing apparatus is urged through screw 3. At the same time, bar 33, which had been manually rightward driven sliding within guide elements 32, has been moved to an extent sufficient to allow the free end of tooth 35 to disengage from the free end of lever 29 rotating about pivot 28; as soon as such disengagement occurs, spring 31 will bring lever 29 back to the position shown in the figures. As soon as bar 33 is no longer rightward urged, it will be brought back to inoperative position by spring 34, as shown in FIG. 1, and on such return movement tooth 35 will strike against the free end of lever 29 and pass beyond the free end of said lever by rotating about pin 36 to be then brought back adjacent stake 38 by spring 37.

As body 11, fast with body 5, effects the last 180° of a full revolution, roller 21 will lower and downward urge head 23 and rod 22, restoring closing member 2 at closed position illustrated in the figures and thus discontinuing the creamy ice-cream delivery through dispensing nozzle 1. When body 11 is completing a full revolution through 360° and is thus returning to the initial position with respect to framework 4, roller 27 will contact the ramp surface of rigid body 30 and move up said ramp surface disengaging toothed projection 15 from recess 25 wherein said projection was accommodated; finally roller 27 will stop against the hook projection of rigid body 30.

In the meantime, coin device 41 has caused electromagnet 39 to be disenergized, which has clamped bar 33 at the position shown in FIG. 1 by releasing movable core 40.

As it may be readily understood, a mechanical and constant delivery of ice-cream through dispensing nozzle 1 is provided by a device such as that shown, the amount being independent of the operator's skill. It is clear that the coin device 41 and electromagnet 39 therewith are not essential for the device operation, and therefore all those changes and modifications resulting as obvious derivations of the particularly described structure may be made thereto.

What I claim is:

1. An operating device for a closing member of an ice-cream dispensing nozzle in a creamy ice-cream continuously producing apparatus, comprising an ice-cream dispensing nozzle, a closing member operable to slectively open and close said nozzle, and means for feeding ice-cream to the nozzle, wherein the device includes a framework, a first rotary body on said framework, means for controlling the rotation of the first body, a second body carried on said framework and freely rotatable about an axis coincident with the axis of rotation for said first body, means for rotatably restraining the first body and second body to each other at at least one predetermined relative angular position, means movable between a first position of non-engagement with said restraining means, rotatably restraining under such conditions the first body and second body, and a second position of engagement with said restraining means, not restraining under such conditions the first body and second body, means for controlling the movement of said movable means between said first position and said second position, and a kinematic assembly connecting said second body to said closing member for said nozzle.

2. A device according to claim 1, wherein said means for rotatably restraining the first body to the second body, selectively restrain the first body to the second body at one of a plurality of different relative angular positions.

3. A device according to claim 1, wherein in said first body there is provided a bore circumferentially defined by a cylindrical wall wherein said second body is rotatably accommodated.

4. A device according to claim 3, wherein said second body is in the form of a disc having a circular periphery.

5. A device according to claim 4, wherein said disc-like body has a straight guide diametrically extending on the body itself, in which on the cylindrical wall of said bore there is provided at least one recess, and in which a slide is retained and movable on said guide, said slide having a projection which may be accommodated within said recess, said projection and said recess forming said means for rotatably restraining said first body and said second body, on the second body there being provided a spring acting on said slide to urge said projection towards the cylindrical wall of said bore.

6. A device according to claim 5, wherein a stake projects from and is fast with said slide, and said members movable between a first position and a second position are formed of a rigid body fixed to and rotatable about a pin fast with said framework, said rigid body having a ramp surface facing said stake.

7. A device according to claim 6, wherein said means for controlling the movement of said movable members comprise a bar movable between guide elements fast with said framework and a tooth carried by said bar and projecting therefrom to said rigid body with which said tooth engages when said bar is moved between said guide elements.

8. A device according to claim 7, wherein a locking latch is provided for said bar movable between guide elements.

9. A device according to claim 1, wherein said kinematic assembly comprises a rod, an end of which is connected to the closing member of said nozzle and the other end of which has a head wherein an elongated oval eye is formed, a cam pin projecting from the second body and penetrating said eye being fast with said second body.

10. A device according to claim 1, wherein a ring gear is provided on said first body, and wherein an electric motor is secured on said framework, a pinion gear engaging with said ring gear being fast with the shaft of said electric motor.

References Cited

UNITED STATES PATENTS 1,044,663   11/1912   Kepford _____ 222—60
3,045,719   7/1962   Burks et al. _____ 222—70

ROBERT B. REEVES, *Primary Examiner.*

HADD S. LANE, *Assistant Examiner.*